March 7, 1967  G. C. FISHER  3,307,420
STEERING MECHANISM
Filed Sept. 21, 1964
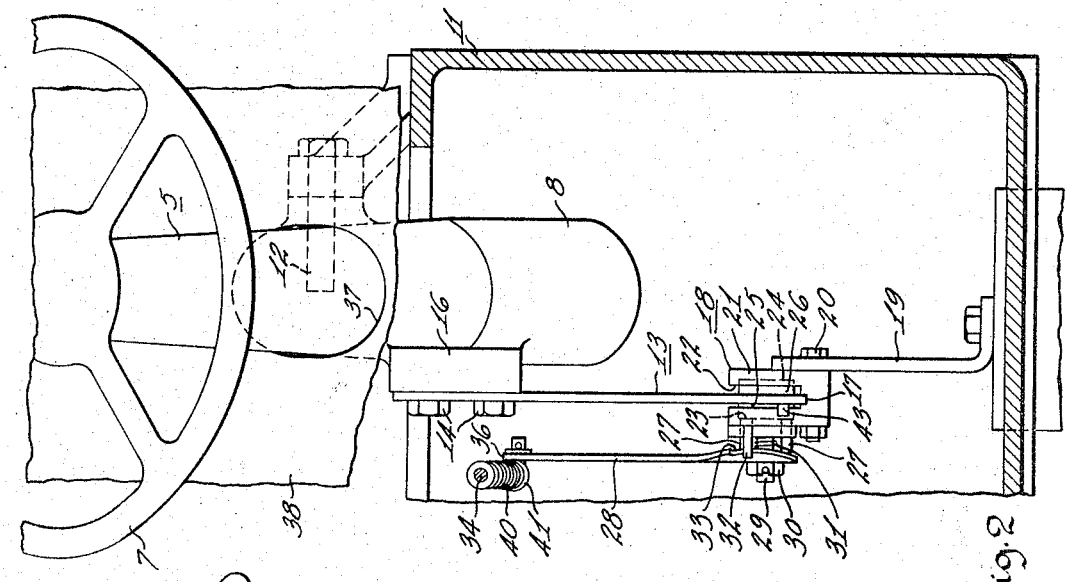
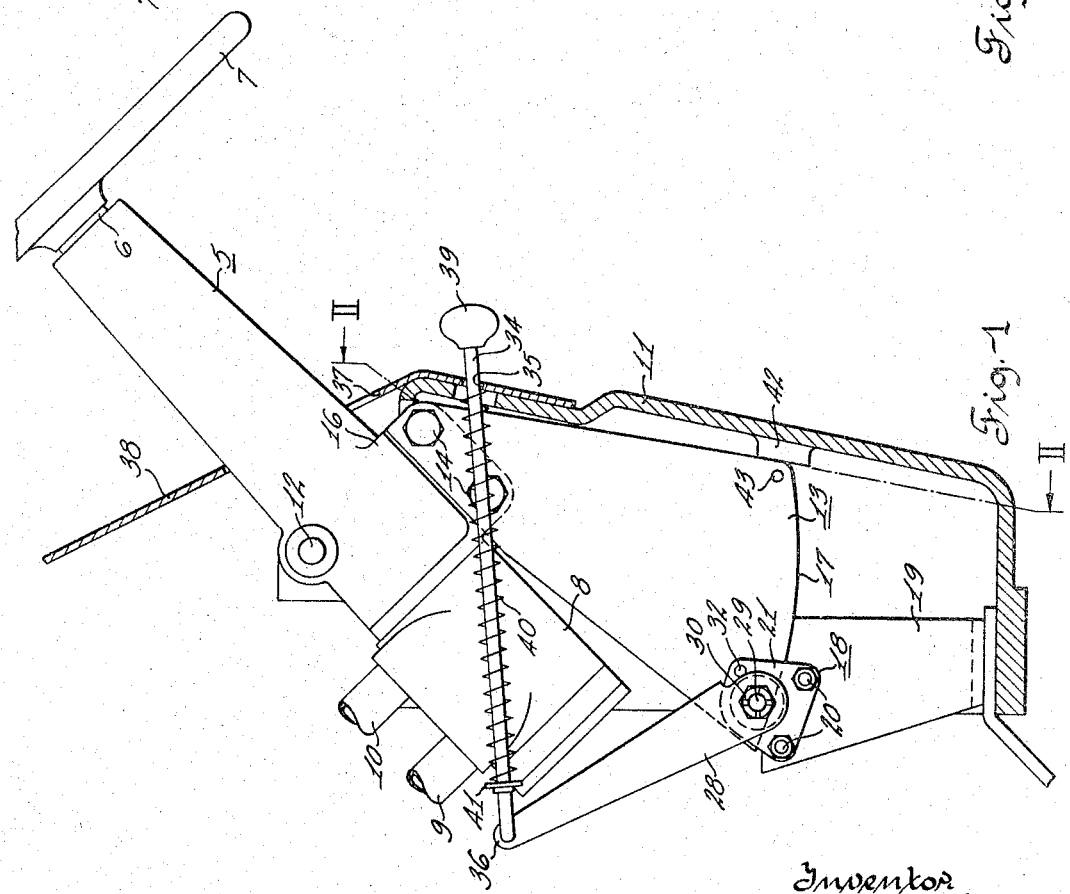
Inventor
Gerald C. Fisher
By Kenneth MacKim
Attorney

United States Patent Office 3,307,420
Patented Mar. 7, 1967

3,307,420
STEERING MECHANISM
Gerald C. Fisher, West Allis, Wis., assignor to Allis-Chalmers Manufacturing Company, Milwaukee, Wis.
Filed Sept. 21, 1964, Ser. No. 397,789
1 Claim. (Cl. 74—493)

This invention relates to tractors, and more particularly to tractor steering mechanisms.

An object of this invention resides in a steering mechanism for tractors which can be readily arranged to extend within convenient reach of the operator for his manipulation when seated in different positions and while standing which is sometimes necessary in the operation of a tractor.

Another object of this invention is to provide a steering mechanism for a tractor which can be readily adjusted as to height in an infinite number of positions.

More specifically, it is a feature of this device to provide an adjustable steering mechanism which can be readily pivoted, within limits, into any vertically adjusted position and securely held in its selected position by a friction brake means that is controlled by a manually actuated rod.

The use of adjustable tractor steering mechanisms which can be vertically positioned within convenient reach of the operator is old and well known in the tractor art. The means for securing the steering mechanism in its vertically adjusted position has previously required the loosening and tightening of bolts, hand nuts, set screws or similar devices which made the adjustment difficult and time consuming to perform especially from the tractor seat in the normal operating position.

Other objects of this invention are to provide an improved tractor steering mechanism whereby the same may be easily adjusted by the operator seated at his station on the tractor, to provide a simple and positive friction brake means to hold the steering mechanism in its adjusted position, and to provide an infinite adjustment of the steering column that is easy to control.

Referring now to the drawings, in which:

FIG. 1 is a side elevation view of a tractor supported steering mechanism with some parts in section to better illustrate the invention;

FIG. 2 is a section view on line II of FIG. 1.

Referring now to FIG. 1, a steering column 5 rotatably supports a steering shaft 6. A steering wheel 7 is attached to the upper end of shaft 6 and a power steering control unit 8 is secured to the lower end of column 5 and is operatively connected to the lower end of shaft 6. Control unit 8 is provided with hydraulic hose connections 9 and 10 which are connected to a hydraulic steering mechanism on the tractor (not shown) which is of conventional design and forms no part of this invention. If desired a universal joint could be attached to the lower end of shaft 6 in place of steering control unit 8 in the event that one wished to utilize only a mechanical steering system.

Column 5 is pivotally mounted on the upper portion of a tractor mounted support 11 by any suitable means such as pin 12. A quadrant 13 is rigidly secured, as by bolts 14, to a mounting pad 16 formed as an integral part of the steering column 5. The quadrant 13 extends downwardly with the lower surface 17 thereof being formed on a radius about the axis of pivot pin 12. The lower arcuate surface 17 is received by a brake unit, generally indicated by the reference numeral 18 which unit is rigidly mounted on a tractor frame carried bracket 19 by means of bolts 20.

The brake unit 18 consists of a housing 21 having a vertical slot 22 (see FIG. 2) for receiving the lower end of quadrant 13. The opposed portions of housing 21 which form slot 22 are provided with complementary recesses 23 and 24 for receiving abrasive pucks or pads 25 and 26, respectively, between which pads, the lower portion 17 of the quadrant 13 is received. The inner brake pad 26 is stationary, being received in round recess 24 formed in the housing 21. The outer pad 25 located in a similar cavity 23 is slidably received in such cavity for movement in a horizontal direction. The left-hand or bottom end of cavity 23 is provided with a pair of horizontally extending openings for slidably receiving a pair of cam pins 27. The right-hand end of cam pins 27 contacts the left-hand end of pad 25. The cam pins 27 are actuated for transverse movement in a direction toward and away from pad 25 by a cam arm 28 which is pivotally mounted on a shaft 29 which is fixed to housing 20 so as to project horizontally therefrom. A castellated nut 30 is threaded on the end of shaft 29 and can be turned and locked with a cotter pin for adjusting the pressure between the brake pads 25 and 26 and quadrant 13. This adjustment also compensates for any wear that might take place. A compression spring 31 surrounds the shaft 29 and resiliently urges the cam arm 28 outwardly against the nut 30. A stop pin 32 is fixed to the housing 21 and extends outwardly to provide an abutment stop for the cam arm 28. The pin 32 is circumferentially located so that the cam arm 28 is in its released position when the arm is against the stop pin 32 or in other words when the cam arm 28 is against stop 32, pads 25 and 26 are not loaded by the cam and therefore permit quadrant 13 to be moved relative to the pads.

It should be understood that when the cam arm 28 is in its released position, i.e., with the arm against stop pin 32, the inwardly projecting cam surfaces 33 of the cam arm 28 are not aligned with the cam pins 27 which permits the pins and associated brake pad 25 to move away from the quadrant 13 thereby releasing the steering column 5 for vertical movement relative to support 11. When the cam arm 28 is pivoted in the opposite direction away from the stop pin 32, the cam surfaces 33 on the cam arm 28 force the cam pins and associated brake pad 25 against the quadrant 13 to provide a friction lock between the pads 25 and 26 that securely locates the steering column in the desired vertical position.

A control rod 34 is pivotally connected to the upper end 36 of cam arm 28, the rod 34 extending rearwardly through an opening 35 in the instrument panel 38 (see FIG. 1), with the rearward terminal end of rod 34 being provided with a knob or handle 39. A compression spring 40 is assembled over the control rod 34 with one end bearing against the front end of instrument panel 38 and the other end of the spring bearing against a washer 41 located on the control rod 34. Normally, the spring 40 urges the control rod in a forwardly direction which movement pivots the cam arm 28 into the position shown in FIG. 1. This movement of the arm 28 cams the brake pads 25 and 26 together against the quadrant 13 to frictionally lock the steering column in position relative to tractor support 11. If the operator wishes to change the vertical position of the steering column, he merely pulls back with one hand the control rod 34 which movement rotates the cam arm 28 in a clockwise direction (as viewed in FIG. 1) until the arm 28 contacts the stop pin 32 thereby releasing the brake and permitting the operator with his other hand to reposition the steering column at the desired height whereupon the operator releases rod 34, the spring 40 returning the rod and cam arm 28 to their forward position to lock the steering column in its newly adjusted position.

The instrument panel 38 is rigid with the support 11 and does not pivot with the steering column, there being elongated opening 37 in the panel to accommodate the vertical movement of the steering column. The range of adjustment is limited by the quadrant 13 contacting an abutment 42 formed as an integral part of tractor support 11 and a pin 43 located on the quadrant and which pin contacts the brake housing 21 to limit the adjustment in the opposite direction.

If desired, it is of course possible to provide a foot control for cam arm 28 in place of hand control 34 which would leave both hands free to swing the steering column to the desired vertical location.

It should now be apparent that the invention provides a vertically adjustable steering mechanism which is accessible to the operator while at his station on the tractor, is easily and quickly operated, which provides infinite adjustment, reliable operation and a simple inexpensive structure.

It should be understood that it is not intended to limit the invention to the specific structure herein shown and described for purposes of illustration, as various modifications within the scope of the appended claim may occur to persons skilled in the art.

The embodiments of the invention in which an exclusive property or privilege is claimed are defined as follows:

In a power steering gear for a motor vehicle, a steering column pivotally mounted on said vehicle for movement in a vertical plane, a steering member connected to said steering column for movement therewith, power steering control means operatively connected to said vehicle and to said steering member for actuation by the latter, friction brake means carried by said vehicle and positioned adjacent said steering column, the improvement comprising spring biasing means normally coacting with said brake means for urging said brake means into frictional holding engagement with said steering column, operating means connected to said spring biasing means and being actuable for releasing said spring biasing means for permitting pivoting of said steering column in a vertical plane to any desired adjusted position, said operating means being so constructed that upon release thereof said brake means instantly locks said steering column in the vertically adjusted position then occupied by said steering column, the portion of said steering column coacting with said brake means being a dependent quadrant portion with the lower surface thereof being on a radius from the point of pivotal connection between said column and said vehicle, and a stop member positioned on said quadrant for limiting the pivotal movement of said quadrant in one direction by contacting a housing of said brake means, said quadrant being limited in pivotal movement in the opposite direction by contact with said vehicle.

References Cited by the Examiner

UNITED STATES PATENTS

| | | | |
|---|---|---|---|
| 999,823 | 8/1911 | Mayhew | 74—493 |
| 2,140,319 | 12/1938 | Heppner et al. | 74—493 |
| 2,910,887 | 11/1959 | Helms | 74—493 |
| 2,988,931 | 6/1961 | Markley et al. | 74—493 X |
| 3,032,134 | 5/1962 | Banker | 74—493 X |
| 3,170,711 | 2/1965 | Dunifon et al. | 74—493 X |

FOREIGN PATENTS

| | | |
|---|---|---|
| 630,757 | 6/1936 | Germany. |
| 902,586 | 1/1954 | Germany. |

FRED C. MATTERN, JR., *Primary Examiner.*

C. F. GREEN, *Assistant Examiner.*